Aug. 21, 1951   W. W. HAMILL   2,565,425
THERMOSTAT FOR CONTROLLING TEMPERATURE OR
RATE OF FLOW OF FLUIDS
Filed Aug. 3, 1948
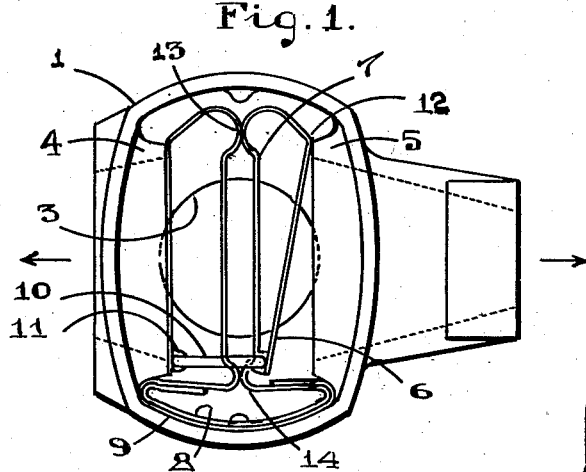
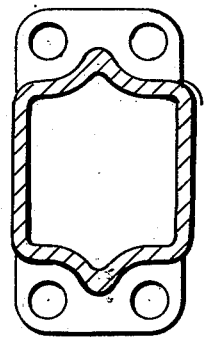
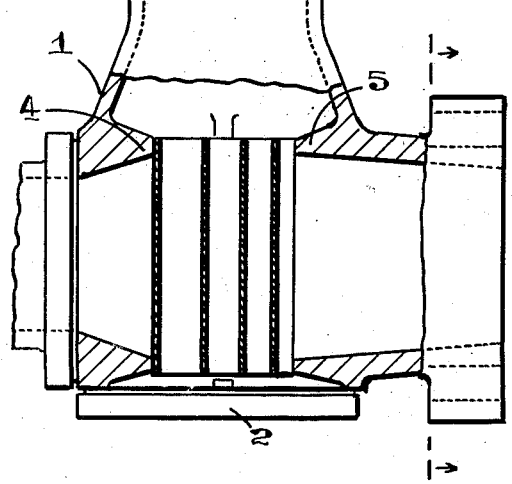
INVENTOR
William W. Hamill
By
William A. Smavey
ATTORNEY.

Patented Aug. 21, 1951

2,565,425

UNITED STATES PATENT OFFICE 2,565,425

THERMOSTAT FOR CONTROLLING TEMPERATURE OR RATE OF FLOW OF FLUIDS

William Wilson Hamill, Little Aston, England

Application August 3, 1948, Serial No. 42,204
In Great Britain August 19, 1947

6 Claims. (Cl. 236—12)

1

This invention relates to thermostats for controlling temperature or rate of flow of fluids, and has for its object the provision of a thermostat which has few parts; which can be manufactured at a low cost; which substantially avoids rubbing friction; which is, therefore, highly sensitive; in which replacement of the thermostatic element or elements is simplified and cheapened; and which is reliable in operation.

A further object is to provide a thermostatic element or elements which can be inserted in a variety of housings according to the purpose and application and provides the practical advantages of being readily replaceable by or interchangeable with other elements which may have different or the same characteristics.

One type of known thermostatic device includes a casing with orifices, a control member arranged to regulate the effective area of one or a plurality of the orifices, and a bi-metallic element or elements adapted to move the control member when subjected to temperature variations.

The purposes of the present invention are realised by so arranging the bi-metallic strip that it or a portion thereof obturates or opens the control orifice or orifices when subjected to temperature variations. It will be apparent that substantial advantages arise from such an arrangement since a separate control member is dispensed with, and the frictional losses set up in the bearings or mountings on which it is carried are avoided. Moreover, the thermostatic ele-element or elements are not subject to constraint by connection with the control member.

Numerous applications of the invention are possible and a particular embodiment will now be described in which there are two thermostatic elements arranged to control two orifices, though obviously a single element or more than two may be used when desired.

Reference may be had to the accompanying drawings in which Figure 1 is an end elevation of apparatus according to the invention, with the cover of the housing removed.

Figure 2 is a sectional plan of Figure 1.

Figure 3 is a view at right angles to Figure 2.

The casing or housing 1 is rectangular, circular or other shape and may be die cast for low cost in production. One suitable construction of casing has one end wall removable as a detachable cover 2 secured by screws or other means, a passageway 3 being formed through the opposite wall to act as an inlet in one example of the invention such as the control of cooling water flow between an internal combustion engine, a

2 radiator, and a pump. In such an instance, the pump delivers liquid to the interior of the casing through the passage 3.

Seats for co-operation with the thermostatic element for regulating the effective area open to the fluid, or for interrupting the flow are conveniently formed by two annular or rectangular bosses 4, 5 which project into the interior of the casing and have their end faces arranged as seating surfaces. One of such bosses may communicate with the radiator, or cooler, or heat exchanger, and the other with a water way in the top of the engine cylinder or cylinder block.

For convenience in assembly, maintenance and renewal the parts are so constructed and arranged that the thermostatic element or elements can be inserted axially within the casing or housing from one end by finger pressure and without the use of tools so that they are self-locating and self-holding without the use of fastenings, the assembly being completed by fixing the cover to close the open end of the inner cell or housing. Manufacture is thereby materially facilitated since it is possible to use an element or elements in a large variety of outer housings having different pipe connection and for a great diversity of applications; further, by making the element or elements interchangeable, the operating temperature can be altered by simply changing the element or elements while the casing is in its working position in the apparatus, appliance, or machine.

The thermostatic element is of any appropriate configuration and in one arrangement, it includes two spaced limbs, one 6 of which acts as a shutter or flap to regulate the effective area of the orifice as aforesaid, being advanced theretowards or retrogressed therefrom according to the temperature to which it is subjected, while the other limb 7 or part thereof is used as an anchorage, abutment, or fulcrum to take the reaction from the operating pressure. Such anchoring may be effected in any appropriate manner; in one instance the end portion 8 of the limb is curved to engage with a similarly shaped recess in the interior wall of the casing. The second element of similar shape employed for controlling the other orifice may have a curved end part 9 arranged to embrace the elliptical anchorage part of the element first mentioned.

In the particular application now being described, it is preferred to employ two thermostatic elements in the manner described arranged so that the two flaps or shutters act in an opposite sense but move in a common direction i. e. when one is subjected to hot water, it opens or enlarges the effective opening of the orifice while the other when concurrently subjected to cool water, reduces or closes the other orifice. For a number of reasons it is desirable that the two elements are operated in unison and a simple manner of ensuring such co-operation is by the provision of a mechanical device coupling together the outer ends (which have the maximum displacement) preferably by means of a U-shaped link or bridle 10 with the two parallel limbs engaging eyes 11 respectively in the end of the two flaps or shutters. The motion of the shutters is somewhat similar to a flap hinged at one end, since they move about their ends 12 which are always close to or in contact with their seats 4, 5. Reactive pressure from the movable shutters may be taken by mutual pressure between the limbs 7, the contact zones at the ends of the limbs being indicated at 13, 14. The portions intermediate such zones may be spaced apart as shown.

In a simple form, apparatus is made without adjustment for change in the operating temperature level, but if desired means may be provided for adjusting said level i. e. by means of a tension spring lever by which a bias is set up on the element tending to displace it laterally and preferably on the limb which is closed when normally cold.

In some applications such as where considerable hydraulic pressure is present e. g. from a water circulating pump, it may be desirable to construct or assemble the thermostatic element of two or more layers or laminations which may be duplicates of each other or not according to the degree of damping and power required to operate against the pressure. Such laminations may be of the same thickness or a different thickness and/or of the same or different contours, to apply a damping effect and prevent fluttering, by interference between the laminations, by frictional effect between the adjacent surfaces, and by different strengths of the laminations. Such construction provides a very convenient arrangement for manufacture since any of the desired characteristics mentioned may be imparted or modified by selective assembly of standard laminations.

If desired, the thermostatic element or elements may be incorporated in a housing provided with flow passages and orifices in manner described, but externally of circular shape for insertion in various housings ported in the bore to register with those on the periphery of the inner cell. Such a structure allows the inner cell to be fabricated as a standard unit for supply say to different makers of automobiles for incorporation in their own specific design of housing.

Having thus described my invention, what I claim is:

1. A thermostatically controlled valve comprising a casing having two oppositely disposed orifices which are spaced to define a valve chamber therebetween, valve seats in opposite sides of said valve chamber and respectively surrounding said orifices, an access opening in said casing coincident with said valve chamber and a removable closure therefor, a pair of thermostatic strip members insertable edgewise through said access opening and removably mounted in said valve chamber and slidably anchored at one of their ends to respectively overlie said valve seats and being free at their other ends to form valves for respective cooperation with said valve seats to control flow through said orifices, said valve forming strip members being thermally responsive in opposite senses and movable in the same direction to variably open one orifice as the other orifice is variably closed, whereby said strip members may be readily and independently replaced.

2. A thermostatically controlled valve comprising a casing having two oppositely disposed orifices which are spaced to define a symmetrical chamber therebetween, valve seats in opposite sides of said chamber and respectively surrounding said orifice, an access opening in said casing coincident with said chamber and a removable closure therefor, and a pair of doubled over thermostatic strips each having one limb forming a back and the other limb forming a valve, said strips being arranged back-to-back and insertable edgewise and either way around through said access opening and slidably sandwiched between said valve seats in said symmetrical chamber with their valve limbs respectively overlying and engaging said valve seats to form valves for respective cooperation with said valve seats to control flow through said orifices, said valve limbs being thermally responsive in opposite senses and movable in the same direction to variably open one orifice as the other orifice is variably closed.

3. A thermostatically controlled valve comprising a casing having two oppositely disposed orifices which are spaced to define a valve chamber therebetween, valve seats in opposite sides of said valve chamber and respectively surrounding said orifices, a recess in said casing between said orifices and opening into one side of said valve chamber, an access opening in said casing coincident with said valve chamber and recess and a removable closure therefor, a pair of doubled over thermostatic strips each having one limb forming a back terminating in a base portion and the other limb forming a valve, said strips being arranged back-to-back and insertable edgewise through said access opening and removably seated in said cavity with their base portions jointly anchored in said recess and their valve limbs respectively overlying and engaging said valve seats to form valves for respective cooperation with said valve seats to control flow through said orifice, said valve limbs being thermally responsive in opposite senses and movable in the same direction to variably open one orifice as the other orifice is variably closed.

4. A valve as defined in claim 3 wherein a link connects the free ends of said valve limbs to cause uniform movement of said limbs.

5. A thermostatically controlled valve comprising a casing having two oppositely disposed orifices which are spaced to define a valve chamber therebetween, valve seats in opposite sides of said valve chamber and respectively surrounding said orifices, oppositely disposed recesses in said casing between said orifices and opening into opposite sides of said valve chamber, said valve chamber and recesses defining a symmetrical cavity in said casing, an access opening in said casing coincident with said valve chamber and recesses and a removable closure therefor, a pair of doubled over thermostatic strips each having one limb forming a back terminating in a base forming bend and the other limb forming a valve, said strips being arranged back-to-back and insertable edgewise and either way around through said access opening and removably seated in said cavity with their doubled bends in one of said recesses and their base bends anchored in the other of said recesses and their valve limbs respectively overlying and engaging said valve seats to form valves for respective cooperation with said valve seats to control flow through said orifices, said valve limbs being thermally responsive in opposite senses and movable in the same direction to variably open one orifice as the other orifice is variably closed.

6. A thermostatically controlled valve comprising a casing having two oppositely disposed orifices which are spaced to define a valve chamber therebetween, valve seats integral with said casing in opposite sides of said valve chamber and respectively surrounding said orifices, oppositely disposed recesses in said casing between said orifices and opening into opposite sides of said valve chamber, an access opening in said casing coincident with said valve chamber and recesses and a removable closure therefor, a pair of thermostatic strips insertable through said access opening and removably mounted in said valve chamber and recesses to form valves for respective cooperation with said valve seats to control flow through said orifices, said strips each being doubled over with one limb forming the valve and the other limb forming the back and having rearward protruding bosses at the end portions thereof, said back limbs terminating in a base forming curved bend, said strips being mounted back-to-back in said valve chamber with their bosses in mutual bearing relationship and their doubled bends in one said recess and their base bends concentric with each other and anchored in the other recess and their valve limbs respectively overlying and engaging said valve seats, said valve limbs being thermally responsive in opposite senses and movable in the same direction to variably open one orifice as the other orifice is variably closed, and a link connecting the free ends of said valve limbs to cause uniform movement of said limbs.

WILLIAM WILSON HAMILL.

REFERENCES CITED

The following references are of record in the file of this patent:

UNITED STATES PATENTS

| Number | Name | Date |
|---|---|---|
| 1,219,516 | Whittelsey | Mar. 20, 1917 |
| 1,512,713 | Reynolds | Oct. 21, 1924 |
| 1,608,205 | Francke | Nov. 23, 1926 |
| 1,819,045 | Snediker | Aug. 18, 1931 |
| 1,984,892 | Phillips et al. | Dec. 18, 1934 |
| 2,211,481 | Scott | Aug. 13, 1940 |
| 2,421,713 | Porter | June 3, 1947 |

FOREIGN PATENTS

| Number | Country | Date |
|---|---|---|
| 350,620 | Germany | Jan. 22, 1921 |